Patented Nov. 7, 1944

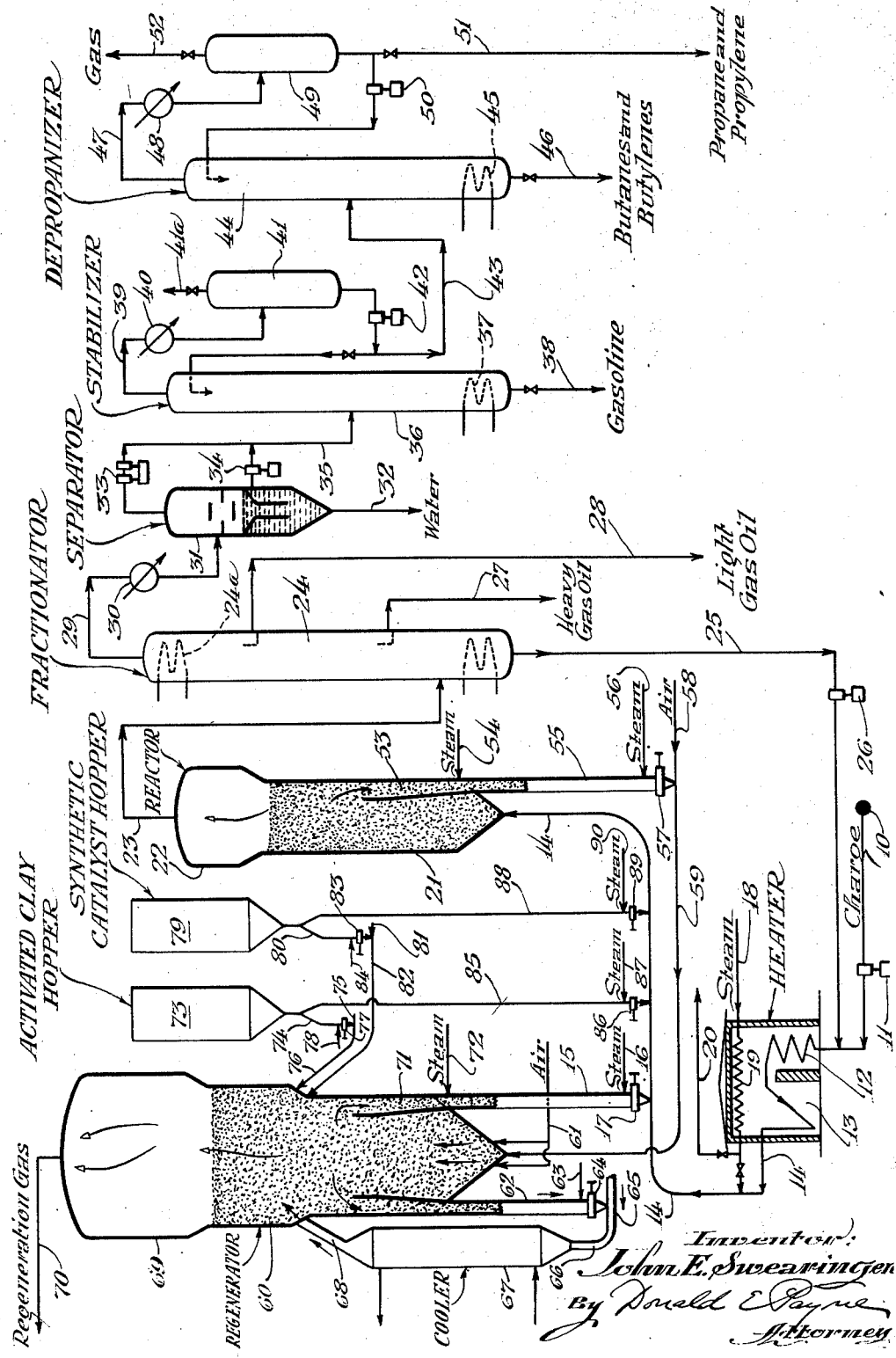

2,361,978

UNITED STATES PATENT OFFICE 2,361,978

CATALYTIC CRACKING SYSTEM

John E. Swearingen, Whiting, Ind., assignor to Standard Oil Company, Chicago, Ill., a corporation of Indiana Application February 28, 1942, Serial No. 432,831

7 Claims. (Cl. 196—52)

This invention relates to catalytic cracking systems of the powdered or so-called fluid-type and it pertains more particularly to an improved method and means for controlling the volatility of produced gasolines and the amount of excess butane and butylene production in such systems.

A fluid-type catalytic conversion system is one in which a powdered catalyst effects conversion while suspended in a gas or vapor stream. The catalyst is then separated from reaction gases and vapors, stripped with an inert gas such as steam, and suspended in a gas mixture for regeneration. The regenerated catalyst is then separated from regeneration gases and resuspended in the original gas or vapor stream for effecting further conversion. My invention relates to an improvement in this system wherein two distinct types of catalyst are commingled in such proportions as to produce desired product distribution and wherein the product distribution may be controlled by varying the relative amounts of these two different types of catalyst.

One catalyst may be of the clay type, an example of which is acid treated montmorillonite clay, commonly marketed as Super Filtrol. Other examples of clay-type catalysts include activated Marcil clay, activated Tonsil clay, etc. Such clays and their methods of activation are well known in the art and require no further description. These clay-type catalysts are generally characterized by a tendency to produce only a very small amount of excess butanes and butylenes and to result in considerable coke formation.

Another type of catalyst is the synthetic silica-alumina type which may be formed by ball milling silica hydrogel with alumina, by co-precipitating silica gel with alumina gel or by impregnating activated silica gel with alumina, either alone or with the addition of zirconia, magnesia, thoria, beryllia or other metal oxides or with the addition of aluminum fluosilicate or other material for making the catalyst more stable against heat. These synthetic silica-alumina catalysts and their methods of preparation are likewise known in the art and require no further description. Synthetic silica-alumina catalysts are generally characterized by a tendency to produce a large excess of butanes and butylenes. These catalysts tend to produce less coke than the clay-type catalysts.

An object of my invention is to provide a unitary system for utilizing an admixture of clay-type and synthetic catalysts in one and the same reaction zone. A further object is to provide an improved method and means for controlling the volatility of produced gasolines and the production of butanes and butylenes by changing the nature of the catalyst while the system is on stream without materially changing operating conditions.

Butanes and butylenes are extremely valuable for the production of aviation gasoline by alkylation or polymerization, for the production of synthetic oils and for the production of butadiene which, in turn, is employed in the manufacture of synthetic rubber. There is, however, considerable fluctuation in the demands for butane and butylenes and in the optimum volatility of gasoline (due to seasonal changes in weather, etc.). The refiner is confronted with the problem of meeting continuously changing demands with regard to butanes and butylenes and with regard to gasoline volatility. A fluid catalytic cracking system is designed to operate under certain specified conditions and it may be a difficult, expensive and time-consuming job to revise the system to meet the ever changing industrial requirements. An object of my invention is to provide a system wherein the operating conditions may be substantially constant and wherein the desired flexibility of operation may be obtained by varying the character of the catalyst which is charged to the system.

My system may be designed for producing either a maximum amount of excess butanes and a volatile gasoline or a minimum amount of excess butane-butylene and a relatively non-volatile gasoline. If it is designed for maximum butane-butylene production it may be started up and operated with the synthetic silica-alumina catalyst. Lessened butane-butylene requirements such as would be occasioned by seasonal variations in gasoline volatility may be taken care of by gradually replacing the synthetic silica-alumina catalyst with the activated clay-type catalyst. On the other hand, the system which has started up with activated clay as catalyst may gradually increase its butane production by having make-up synthetic silica-alumina catalyst continuously added thereto. Optimum product distribution may thus be obtained by simply varying the relative amounts of the two types of catalysts while the over-all operating conditions remain substantially unchanged. It will be seen that this method of regulating product distribution is extremely simple, it avoids costly shut-downs of cracking equipment and it enables a given installation to operate at all times under conditions of maximum efficiency. The term "product distribution" as employed in this specification and in the accompanying claims is hereby defined as having the meaning which is commonly associated with such expression in the petroleum refining art; the "product" of petroleum refining usually consists of different components the relative amounts of which may vary within a considerable range and product distribution is the distribution of such components, i. e., the relative amounts of each component in the final product.

It is readily apparent that if butane-butylene requirements are known in advance of putting on stream a powdered catalyst cracking unit, the necessary admixture of catalysts can be used for the initial fill. The concentrations of natural and synthetic catalysts can be maintained by controlling the ratio of natural to synthetic catalyst in the catalyst added to replace unavoidable losses.

In addition to volatility control the admixture of clay-type with synthetic silica-alumina type catalysts has other important advantages. Thus an admixture of about 10 to 90% of activated clay-type catalyst with 90 to 10% of synthetic silica-alumina catalyst provides a system wherein the coke deposition will be lower than in the case of the clay-type catalyst alone. Each type of catalyst tends to mask the shortcomings of the other type of catalyst so that the resulting mixture is remarkably superior in its over-all performance.

The invention will be more clearly understood from the following detailed description of a specific example thereof read in connection with the accompanying drawing which forms a part of this specification and which is a schematic flow diagram of a powdered catalyst cracking system designed for butane-butylene production and recovery.

The charging stock employed may be a gas oil or heavier hydrocarbon from petroleum or other source. Instead of virgin charging stock I may employ cracked stocks or the so-called cycle stocks, i. e., hydrocarbons which have been produced in a previous thermal or catalytic conversion system. Also, I may employ hydrocarbons produced by the hydrogenation of carbonaceous materials or by the synthesis of carbon monoxide with hydrogen (the so-called Fischer process).

My clay-type catalyst in this particular example is an acid treated montmorillonite clay which is commonly marketed as Super Filtrol. My synthetic silica-alumina catalyst is made by forming a gel from dilute sodium silicate in the presence of an aluminum salt by the addition of excess dilute sulfuric acid, boiling the resulting gel for an hour or two with an excess of ammonium hydroxide solution, washing the boiled gel, then drying it and activating it by heating it to a temperature of about 900 to 1000° F. The catalyst may contain from about 2 to 30%, for example about 15%, of alumina and, as hereinabove stated, it may also contain zirconia, thoria, beryllia, aluminum fluosilicate or other component for increasing its heat stability or otherwise improving its effectiveness.

Both catalysts in this specific example are employed in powdered form with a particle size ranging from about 1 to 100 microns, chiefly within the range of 20 to 80 microns. The invention is applicable to other catalyst sizes provided only that the catalyst be of such size and density that it may be aerated and handled as a fluid in the manner herein described. The density of the two catalysts is approximately the same. In settled form their density may range from 30 to 45 pounds per cubic foot. With slight aeration, i. e., with gas or vapor velocity of about 0.05 to 0.5 foot per second, their bulk density may range from about 25 to 35 pounds per cubic foot and under such conditions the catalyst is referred to as "aerated catalyst." With vertical vapor velocities of about 1 to 2 or 3 feet per second, the bulk density of such catalyst may be within the approximate range of 10 to 25 pounds per cubic foot; it is at such gas or vapor velocities that the powdered catalyst is maintained in the dense turbulent suspended catalyst phase which has been found to be most satisfactory for effecting cracking and regeneration. With higher and higher vapor velocities the bulk density of the catalyst becomes less and less. In zones above the level of dense phase catalyst in cracking, treating or regeneration zones, the average bulk density of catalyst is usually less than 1 pound per cubic foot and at such conditions the catalyst is said to be in the dilute, light or dispersed phase. This dilute phase may contain only about 50 grains or less of catalyst material per cubic foot.

Referring to the drawing, a gas oil charging stock from source 10 is passed by pump 11 through coils 12 of pipe still 13 which may be fired to give a temperature in transfer line 14 (after addition of hot catalyst) within the approximate range of 750 to 1050° F., for example about 900° F. Catalyst from standpipe 15, which is aerated by steam introduced through line 16, is introduced into transfer line 14 in amounts regulated by valve 17. The catalyst-to-oil ratio in line 14 may range from about 0.5 to 1 to 10 or more to 1 and, for example may be about 4 to 1. If desired, steam from line 18 may be superheated in coil 19 and a part of it distributed throughout the system through line 20 for supplying the necessary aeration steam and another part introduced through line 14 or otherwise employed for dispersing the catalyst in charging stock vapors.

This stream of charging stock vapors and suspended catalyst is introduced at the base of reactor 21 which may be a vertical cylindrical vessel with an enlarged upper portion 22. This vessel is of such diameter that the vertical vapor velocity therethrough will be of the order of 1 to 3 feet per second in the main part of the reactor and considerably lower in the upper enlarged portion thereof. The weight space velocity, i. e., the weight of charging stock introduced per hour per weight of catalyst material in the reactor may range from about 0.5 to 10 or more, and may be, for example, about 2. The catalyst residence time in the reactor may be about 1 to 20 minutes or more, for example about 10 minutes, and the charging stock residence time, i. e., the vapor contact time in the reactor, may be within the approximate range of 10 to 60 seconds, for example about 30 seconds. The pressure in the top of the reactor may be within the range of atmospheric to 25 pounds or more and, for example, may be about 8 pounds per square inch gauge pressure.

Catalyst separates out of the gases in the upper enlarged part of the reactor and, if necessary or desirable, I may employ screens, filters, cyclones or other separating means for augmenting the gravity separation. Products leaving the reactor through line 23 enter the base of fractionating column 24 wherein residual catalyst material is scrubbed out of ascending vapors and recycled through line 25 by pump 26 back to the charging stock inlet for recycling. A heavy gas oil stream may be withdrawn through line 27 and a light gas oil stream through line 28.

Gasoline and lighter products are taken overhead through line 29 and cooler 30 to separator 31. Condensed steam is withdrawn from the base of the separator through line 32. Gases are compressed by compressor 33 and liquid hydrocarbons are pumped by pump 34 to a pressure of about 1 to 300, for example, about 200 pounds per square inch and these gases and liquids are then introduced through line 35 into stabilizer column 36 which is provided with suitable heating means 37 at its base. Gasoline of desired Reid vapor pressure is withdrawn through line 38.

Gases are taken overhead through line 39 and cooler 40 to receiver 41 from which reflux is returned by pump 42 back to the top of tower 36. The remaining overhead stream is introduced by line 43 into column 44 which may likewise be provided with suitable heating means 45 at its base. This column may be operated under such conditions as to recover butanes and butylenes from the base through line 46 and to take propane and lighter gases overhead through line 47 and cooler 48 to receiver 49. A part of the condensed propane may be returned by pump 50 to serve as reflux in the top of column 44. Excess propane and propylene may be withdrawn through line 51 and uncondensed gases may be vented through line 52. My invention is not limited to any particular type of fractionation system and it should be understood that the above description is diagrammatic and illustrative but not by way of limitation.

Catalyst is withdrawn directly from the dense turbulent suspended catalyst in reactor 21 through stripping zone 53 at the base of which steam is introduced through line 54. This catalyst then passes through standpipe 55 which is aerated at its base by steam introduced through line 56. Catalyst from the base of the standpipe is discharged in amounts controlled by valve 57, picked up by air introduced through line 58 and conveyed by line 59 to regenerator 60. Additional air may be introduced at the base of the regenerator through lines 61.

The regenerator may be at least three or four times the size of the reactor and should have such cross-sectional area as to maintain an upward gas velocity within the approximate range of about 1 to 3 feet per second. Temperature control may be effected by simply employing heat exchange or steam generator tubes in the regenerator or by recycling regenerated catalyst through a cooler and then returning it back to the regenerator. Thus catalyst may be withdrawn through standpipe 62, maintained in fluent condition by air introduced through line 63, discharged in amounts regulated by valve 64, picked up by air introduced through line 65, conveyed by line 66 through cooler 67, and returned by line 68 to an enlarged upper part of the regeneration zone. Catalyst settles out of regeneration gases in enlarged upper part 69 of the regenerator. Suitable screens, cyclones or other auxiliary means may be employed to prevent catalyst losses with regeneration gases at this point. The regeneration gases which leave through line 70 may be passed through suitable heat or power recovery means and additional catalyst may be recovered from the gases by suitable scrubbing means, electrostatic precipitators or other known instrumentalities.

Regenerated catalyst is withdrawn from the dense phase in the regeneration zone through stripping section 71 at the base of which steam may be introduced through line 72. The regenerated catalyst then flows through standpipe 15 for suspension in the charging stock stream as hereinabove described.

In starting up the system I may close valve 57 and introduce a fuel gas through lines 58 and 59 which is burned in regenerator 60 by air introduced through line 61. Activated clay from source 73 may be picked up at the base of standpipe 74 by air introduced through line 75 and conveyed by line 76 to the regenerator until the catalyst has reached the desired level and the desired temperature in the regenerator. Catalyst may then be picked up by steam and carried to the reactor through line 14 until the desired amount of catalyst at the desired temperature is present in said reactor. At this time the oil charging stock may be introduced to the system, valve 57 may be opened and air introduced through line 58, and the amount of catalyst introduced from source 73 may be reduced to supply only the necessary make-up catalyst which may be in the general vicinity of about 0.2 to 2 pounds per barrel of stock charged.

If a change is desired in product distribution valve 77 may be closed and the catalyst in standpipe 74 may be maintained in fluent condition by air introduced through line 78. Make-up catalyst from source 79 may be picked up at the base of standpipe 80 by air introduced through line 81 and conveyed by line 82 to the regenerator so that the composition of the catalyst in the system will be gradually changed. Within two weeks at normal catalyst loss rates of the order of 0.2 to 2.0 pounds per barrel of charge, the catalyst in the system may contain from 5 to 50% of the synthetic catalyst and the butane-butylene production will thus be markedly increased. If it be found that normal catalyst losses and additions are insufficient to effect the desired variation in concentration of the two catalysts in the system within a reasonable period, catalyst losses may be artificially increased to as much as 10 pounds per barrel or more by merely removing from operation cyclone separators or other catalyst recovery equipment contacting the flue gas stream at point 69. An alternative to increasing the catalyst losses will be to divert such a portion of the catalyst to storage through dip leg 15 that the addition of 0.2 to 10 pounds or more of catalyst per barrel is required. Such expedients to enable a rapid changeover of catalyst would be resorted to only in extreme cases since for most purposes the changeover could be accomplished at regular catalyst loss rates. When the desired proportion of synthetic catalyst to activated clay catalyst has been reached this proportion may be maintained in the system by partially closing valve 83 (the catalyst in standpipe 80 being maintained in fluent condition by aerating gas introduced through line 84) and partially opening valve 77. The desired ratio of synthetic catalyst to activated clay may thus be altered in either direction or maintained at any desired point without shutting down the system and without materially altering the operating conditions on the conversion side. When the carbon deposits are decreased due to the admixture of catalysts, a lesser amount of heat will have to be removed from the regenerator and consequently a lesser amount of catalyst will have to be recycled through cooler 67.

Instead of adding make-up catalyst to the regenerator we may add this make-up catalyst directly to line 14. Activated clay may be introduced through standpipe 85 in amounts controlled by valve 86, the catalyst in this standpipe being aerated by steam introduced through line 87. Synthetic catalyst may be introduced from the base of standpipe 88 in amounts regulated by valve 89, the catalyst in this standpipe being aerated by steam introduced through line 90.

With the synthetic silica-alumina catalyst of the type hereinabove described I may obtain as much as 20 to 30% of butanes and butylenes while with the activated clay-type catalyst the excess butanes may be of the order of 2 to 10% under the same operating conditions. In other words, the butane-butylene fraction may be varied within the approximate range of about 5 to 25% by varying the proportion of synthetic catalyst to activated clay catalyst in the conversion system without varying any of the actual conversion conditions.

My invention is not limited to the use of activated clay and silica-alumina type catalysts but is applicable to other catalyst mixtures. For example, a silica-magnesia catalyst may be prepared by ball milling silica hydrogel with about 2 to 30%, for example about 15% of magnesia, drying the resulting dough and then activating at a temperature of about 900 to 1000° F. The resulting silica-magnesia catalyst is characterized by the production of an even lesser amount of butane-butylene fraction than the activated clay type catalyst. In fact, under certain operating conditions the butane-butylene fraction produced by the silica-magnesia catalyst may be only sufficient for supplying the desired volatility of the produced gasoline and the excess butane-butylene fraction may be substantially nil. The silica-magnesia catalyst is characterized by much lower carbon deposits than the activated clay type catalysts and I may, therefore, employ various ratios of silica-magnesia to silica-alumina catalysts in the system and avoid entirely the use of activated clay.

In addition to regulating the product distribution, product volatility, and excess butane-butylene production, my invention is applicable to regulating the composition of the butane-butylene fraction itself. The activated clay type catalysts tend to give a butane-butylene fraction which is predominantly unsaturated while the synthetic silica-alumina catalyst tends to give a butane-butylene fraction which is predominantly saturated. The synthetic silica-magnesia catalyst produces a butane-butylene fraction which is highly unsaturated. A silica-alumina-zirconia catalyst on the other hand may produce a butane-butylene fraction which is highly saturated. Catalysts may thus be selected and admixed in suitable proportions for determining not only the amount of excess butane-butylene fraction but for likewise regulating the product distribution in this particular fraction.

While I have described in detail a specific example of my invention it should be understood that this description is illustrative and not by way of limitation. A wide variety of charging stocks and operating conditions may be employed and various alternative arrangements of apparatus may be used. Numerous modifications and alternatives will be apparent to those skilled in the art from the above description.

I claim:

1. In a catalytic process of hydrocarbon conversion wherein a powdered cracking catalyst is suspended in and contacted with vapors of a hydrocarbon oil in a contacting zone for producing product components of various molecular weights and boiling ranges, wherein powdered catalyst is withdrawn from the contacting zone and suspended in and contacted with an oxygen-containing gas in a regeneration zone for regenerating said catalyst and wherein catalyst from the regeneration zone is then resuspended in further hydrocarbon vapors in said contacting zone, the method of controlling product distribution which method comprises introducing into said system a powdered catalyst having the property of repressing the formation of volatile hydrocarbons such as butanes and butylenes, introducing into the same system another powdered catalyst having the property of producing large amounts of volatile hydrocarbons such as butanes and butylenes, and controlling the product distribution in the system by varying the relative proportion of said catalysts introduced therein.

2. The method of claim 1 wherein the catalysts are introduced into the regeneration zone before they reach the conversion zone.

3. The method of claim 1 wherein the catalyst having the property of repressing the formation of volatile hydrocarbons is an activated clay.

4. The method of claim 1 wherein the catalyst having the property of repressing the formation of volatile hydrocarbons contains silica and magnesia.

5. The method of claim 1 wherein the catalyst having the property of producing large amounts of volatile hydrocarbons is a synthetic composition consisting chiefly of silica and alumina.

6. The method of claim 1 wherein the catalyst having a property of producing large amounts of volatile hydrocarbons is a synthetic composition consisting essentially of silica, alumina and zirconia.

7. In a catalytic process of hydrocarbon conversion wherein powdered cracking catalyst is suspended in and contacted with vapors of a hydrocarbon oil in a contacting zone at a temperature within the approximate range of 750° F. to 1050° F. at least a part of said contacting zone being a vertical zone of sufficiently large cross-sectional area so that the vertical vapor velocity therethrough will be within the approximate range of about 1 to 3 feet per second, the average bulk density of the catalyst in said zone will be of the order of about 10 to 25 pounds per cubic foot and the weight space velocity in said zone will be of the order of about 0.5 to 10 weight units of charging stock introduced per hour per weight unit of catalyst in said zone, wherein powdered catalyst is withdrawn from the contacting zone and suspended in and contacted with an oxygen-containing gas in a regeneration zone under conditions for regenerating said catalyst, wherein catalyst from the regeneration zone is then resuspended in further hydrocarbon vapors in said contacting zone and wherein a product stream from the contacting zone is fractionated to obtain a butane-butylene stream and a gasoline stream, the method of controlling the amount of butanes and butylenes recoverable in said butane-butylene stream which method comprises introducing into said system a powdered synthetic silica-alumina catalyst, introducing into the same system, a different powdered catalyst having the property of repressing the formation of butanes and butylenes, and controlling the product distribution in the system by varying the relative proportion of said catalysts so introduced.

JOHN E. SWEARINGEN.